Patented Mar. 26, 1940

2,195,073

UNITED STATES PATENT OFFICE 2,195,073

PROCESS FOR THE MANUFACTURE OF GUANIDINIC DERIVATIVES

Alessandro Beretta, Milan, Italy, assignor to "Montecatini" Società Generale per l'Industria Mineraria e Chimica, Milan, Italy, a corporation of Italy No Drawing. Application February 20, 1937, Serial No. 126,943. In Italy February 29, 1936

1 Claim. (Cl. 260—565)

It is already known that an arylbiguanide can be obtained by the fusion in the dry and at high temperatures of a mixture of dicyandiamide with an aromatic amine or with one of its derivates. For example, orthotolylbiguanide is prepared by fusion in the dry of dicyandiamide with orthotoluidine hydrochloride. It has also been proposed, in order to keep the temperature of reaction low and so obtain an economic advantage, to treat the same reagents in the wet in the presence of special solvents. The cost of the latter, however, renders that method of procedure not very convenient.

It has now been found that the same reaction may be carried out at relatively low temperatures, even in an aqueous medium, when care is taken to ensure the presence of an excess of acid. To a given and constantly stirred quantity of water are added, approximately in molecular proportions, the dicyandiamide and the aromatic amine or a derivative thereof. The whole is then heated and the acid (for example, hydrochloric acid) is added, preferably slowly, and the heating is continued for a certain period of time. The mass obtained is, after cooling, rendered alkaline; in this manner a white precipitate is obtained, composed of arylbiguanide, which is then filtered, washed and dried.

*Example 1.*—One hundred and twenty parts of dicyandiamide and 140 parts of orthotoluidine are added to 600 parts of water kept well stirred. The whole is heated to 80–85° C. and, during the space of an hour, 161 parts of hydrochloric acid 20/21° Bé. are added; afterwards, heating is continued for eight hours. The reactional mass, after cooling to 20–25° C., is rendered alkaline with 125 parts of 25% caustic soda solution. After allowing to stand for a few hours, the white precipitate, composed of orthotolylbiguanide which forms is filtered, washed and dried. Its melting point is 142–144° C.

*Example 2.*—Eighty-five parts of dicyandiamide and 142 parts of orthotoluidine hydrochloride are added to 500 parts of water; following the same system given in Example 1, 50 parts of hydrochloric acid 20–21° Bé. are then added and the whole heated for eight hours at 80–85° C.: after cooling, the white well-developed crystals (composed of orthotolylbiguanide hydrochloride) are filtered out. The base is subsequently set free by adding a 25% caustic soda solution.

The process described produces very pure products and with an excellent yield; moreover, on account of the relatively low temperature employed, it is much more economical than the processes known so far.

I claim:

A process for the manufacture of orthotolylbiguanide, which comprises heating dicyandiamide in an aqueous medium with a compound selected from the group consisting of orthotoluidine and orthotoluidine hydrochloride, in the presence of more hydrochloric acid than the amount required for neutralization, at a temperature of approximately 80–85° C., and alkalizing the mass so formed after it cools, by treatment with an alkaline compound.

ALESSANDRO BERETTA.